United States Patent [19]
Jarl

[11] 3,895,297
[45] July 15, 1975

[54] APPARATUS FOR NON-DESTRUCTIVELY TESTING A FORWARDLY BIASED TRANSISTOR FOR SECOND BREAKDOWN

[75] Inventor: Ronald Burnett Jarl, Belle Mead, N.J.

[73] Assignee: RCA Corporation, New York, N.Y.

[22] Filed: June 2, 1972

[21] Appl. No.: 259,036

[52] U.S. Cl. .......... 324/158 T; 324/110; 324/158 D
[51] Int. Cl. .......................... G01r 31/22; G01r 1/36
[58] Field of Search ............ 324/158 T, 158 D, 110

[56] References Cited

UNITED STATES PATENTS

| | | | |
|---|---|---|---|
| 3,054,954 | 9/1962 | Boscia et al. | 324/158 T |
| 3,392,332 | 7/1968 | Christensen | 324/110 |

OTHER PUBLICATIONS

Schafft et al.; "Second Breakdown . . . ;" IRE Trans. Electron Devices; Vol. ED-9; pp. 129–136; March 1962.

Schiff, P.; "Preventing Second Breakdown . . . ;" Electronics; June 15, 1964; pp. 66–74.

Schafft, H. A.; "Second Breakdown . . . ;" Proc. IEEE; August 1967; pp. 1272–1288.

*Primary Examiner*—Alfred E. Smith
*Assistant Examiner*—Ernest F. Karlsen
*Attorney, Agent, or Firm*—Edward J. Norton; William Squire

[57] ABSTRACT

To non-destructively test a transistor for second breakdown a high power signal is applied across the collector and emitter of a forwardly biased transistor. The apparatus is responsive to a voltage transient which appears should second breakdown occur to cut off the test signal prior to the actual destruction of the transistor under test by the second breakdown.

9 Claims, 9 Drawing Figures

APPARATUS FOR NON-DESTRUCTIVELY TESTING A FORWARDLY BIASED TRANSISTOR FOR SECOND BREAKDOWN

This invention relates to transistor test apparatus and more particularly to apparatus for non-destructively testing a transistor at high power levels and precluding the destruction of the transistor by second breakdown should the transistor fail the test.

In certain applications it is advantageous to use particular types of transistors as power devices. These power transistors are subject to relatively high currents and high voltages. However, in order to rate these particular transistors it is necessary that they first be tested to prove out their actual power handling capabilities. Since power handling capability is not uniform from transistor to transistor, even though they be of the same type, it is necessary to individually test each transistor to prove out its capability.

The constant power line for low voltage operation of these devices is typically determined by thermal resistance measurements, whereas the rise time of the junction temperature of the device determines a family of transient power curves. Power is applied to the device in a given time period to reach a predetermined temperature. That time period determines the constant power curve.

The mechanism by which second breakdown occurs is not a voltage breakdown but rather an electrically and thermally regenerative process in which current is focused in a very small area of the device. Very high current together with the voltage across the transistor causes a localized heating that may melt a minute hole from the collector to the emitter of the transistor and thus cause a short circuit. This regenerative process is not initiated unless certain high voltages and currents are coincident for certain finite lengths of time. The second breakdown condition occurs whithin a few microseconds.

Because of the rapidity with which second breakdown occurs, testing of the devices at their second breakdown rating usually results in permanent destruction of the device should the device fail to test. Therefore, it is economically advantageous to d.c. power test the devices and project the second breakdown characteristics of the device. Testing a given transistor to its power rating levels will prove whether or not that transistor meets its rating requirement. If the device should fail the test, the device is permanently destroyed and is unusable for lower power applications. This type of testing is uneconomical and wasteful as many devices are destroyed which would otherwise be useful for lower power applications.

In the past in prior art systems, removal of a test current by disconnecting the test signal from across the transistor has been found to be too slow to save the transistor from damage. These tests have used inductive sensing arrangements for sensing the increased second breakdown currents. Other tests have used arrangements for sensing collector current. Thus, the art of testing forwardly biased transistors at high power levels is presently at the state such that in certain applications these transistors need to be destructively tested in order to determine whether or not they will meet their rated energy capabilities.

SUMMARY OF THE INVENTION

In accordance with the present invention, an apparatus for non-destructively testing a transistor having a control electrode and a pair of main electrodes includes first means for applying forward bias between the control electrode and one of the main electrodes. Second means enabled during the testing applies a test current through each of the main electrodes whereby upon the occurrence of forward bias second breakdown a transient signal appears at one of the main electrodes. Third means are coupled to the second means and the transistor and are responsive to the occurrence of the transient signal at the main electrode for removing the test current from the main electrodes prior to the destructive failure of the transistor.

IN THE DRAWINGS

FIGS. 1*a* and 1*b* are curves used in explaining the present invention,

FIG. 2 is a block diagram of one embodiment of the circuit of a test instrument embodying the present invention, and FIG. 3 is a more detailed circuit diagram of the test instrument of FIG. 2.

DETAILED DESCRIPTION

Figure 1A:
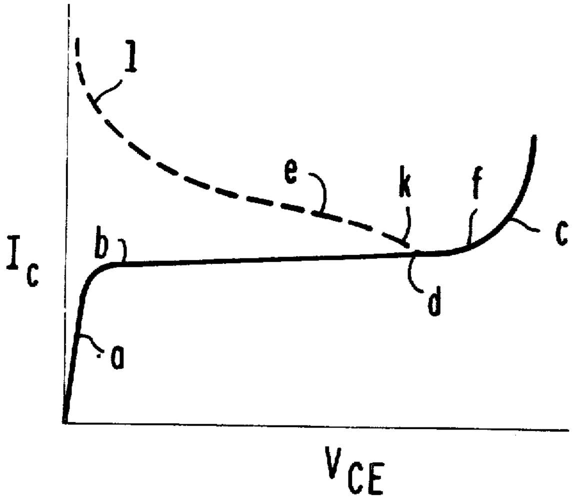

As uniform current is applied to a forwardly biased transistor, after an initial rise in the current as indicated at a FIG. 1*a*, the voltage increases approximately linearly with substantially no change in the current as indicated at *b*, until at point *c*, the voltage across the transistor ceases to increase or may even decrease even though higher currents are applied to the device. The point *c* is called the first breakdown of the transistor. This is a voltage breakdown of the device. However, prior to the point c being reached, a point *d* is reached at which the voltage across the transistor collapses substantially to zero as indicated by the dotted curve *e*. Point d is called the forward biased second breakdown point. In testing power transistors, devices may be tested at a current and voltage which is greater than the second breakdown at point *d*. The test current and voltage may be located at point *f*. Clearly, when the transistor is subjected to a current and voltage at point *f*, second breakdown occurs immediately and the device destructively fails.

Figure 1B:
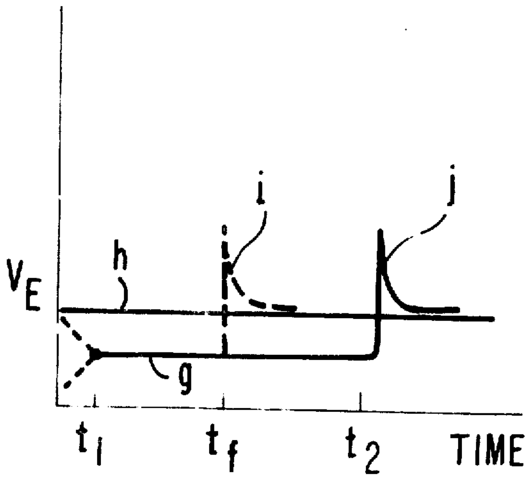

In FIG. 1*b* there is a plot of the emitter voltage of the device under test versus time. At the beginning of the test, the voltage at the emitter is indicated at *g* and remains fairly constant for the duration of the test between time $t_1$ and time $t_2$. The reference voltage is shown at *h*. Should the voltage and current of the device with respect to its forward biased second breakdown characteristic be at *f* of FIG. 1*a*, then a fraction of a microsecond after collapse of the voltage as shown at *e*, FIG. 1*a*, a voltage transient *i*, FIG. 1*b*, occurs at the emitter of the device under test. This voltage transient is for a forwardly biased transistor and is a positive excursion which momentarily passes through the reference potential *h*. The time between the start of the test $t_1$ and the time of failure $t_f$ may be of any value as determined by the duration of a test pulse. Should no failure occur and the end of the test is reached at time $t_2$, then removal of the test current from the collector-emitter circuit of the transistor under test results in a voltage transient *j* at the emitter of this transistor which is almost identical in characteristic as the failure voltage transient *i*. The voltage transient *j* occurs within a fraction of a microsecond after the emitter-collector current is turned off.

The failure voltage transient *i* occurs at point *k* of FIG. 1*a*. A fraction of a microsecond after the transient occurs at *k*, the point *l* is reached, FIG. 1*a*, at which many transistors are destroyed by the highly localized currents flowing through the device being tested. Thus, as indicated above, a voltage transient occurs at the emitter of the forwardly biased transistor at the initiation of forward biased second breakdown thereof and a fraction of a microsecond before the transistor is damaged. A circuit for detecting second breakdown voltage transients and for removing the test current from across the transistor in response to these voltage transients in time to prevent damage to the device under test is shown in FIGS. 2 and 3.

Figure 2:
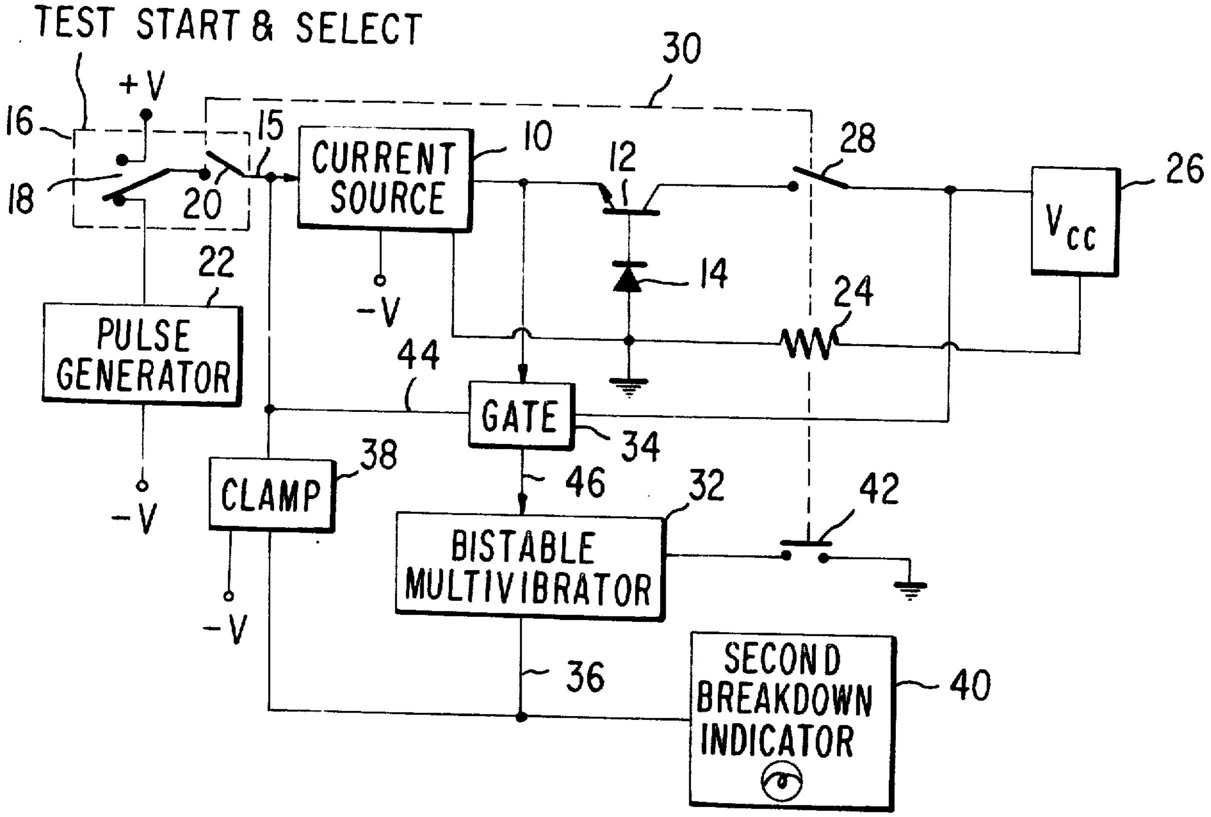
Figure 3:
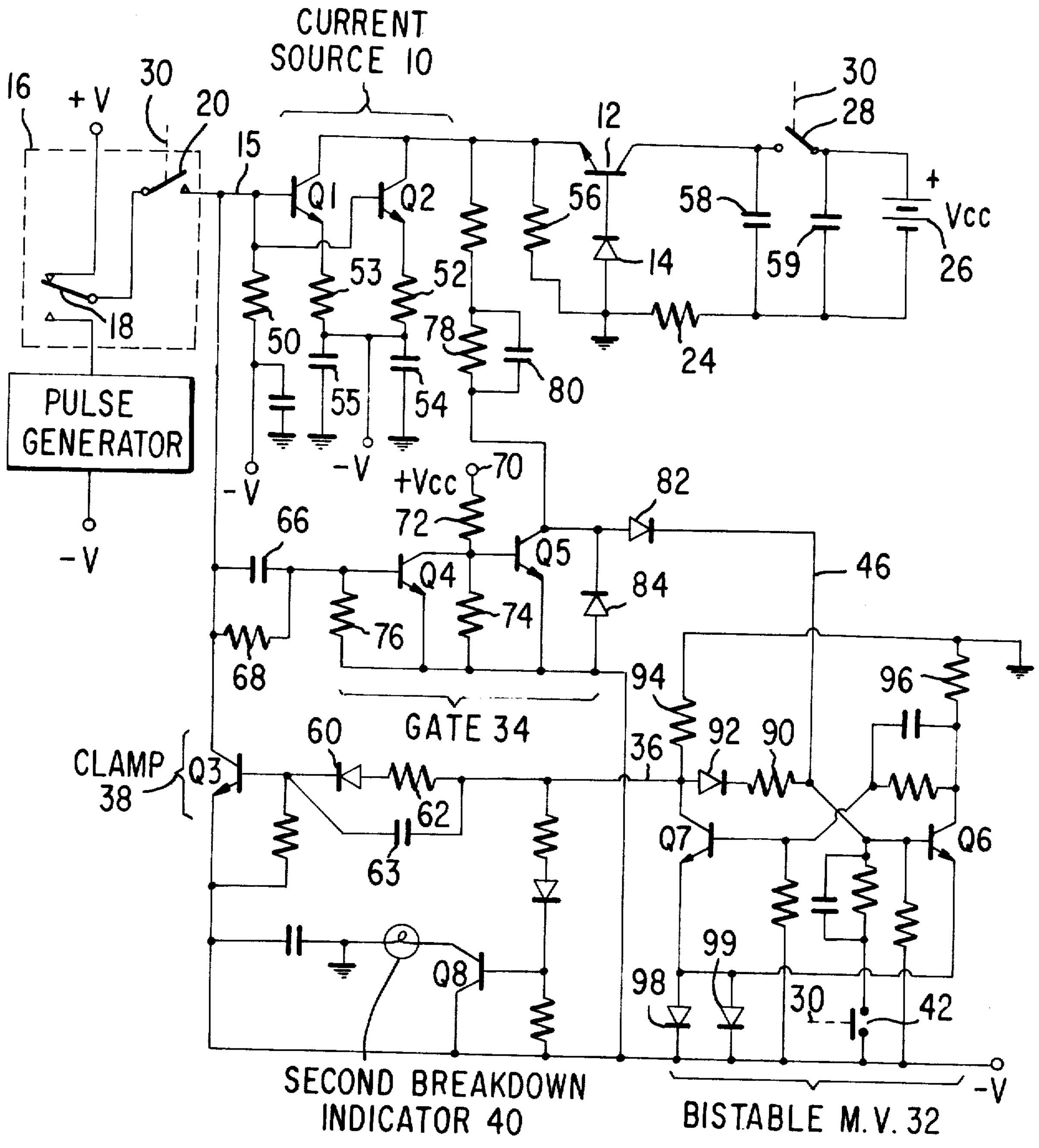

In FIG. 2, current source 10 is coupled to the emitter of transistor 12 to be tested and to the base of transistor 12 through disconnect diode 14 poled to flow current in the forward biased direction, the anode of the diode being connected to a reference potential. A voltage source −V is connected to current source 10. Test start and select circuit 16 is coupled to current source 10 by way of lead 15 and to a source of voltage +V and to a source of pulses, pulse generator 22, which in turn is connected to a source of voltage −V. Test start and select circuit 16 includes mode selection switch 18 which selectively couples either source of voltage +V or pulse generator 22 to lead 15 through start switch 20. Switch 20 serves to start and end the test. When either +V or pulses from pulse generator 22 are applied to current source 10 along lead 15 when switch 20 is closed, current source 10 is enabled driving transistor 12 into conduction in the forward bias mode.

The anode of disconnect diode 14 is coupled to the collector of transistor 12 through collector current sensing resistor 24, collector voltage source 26, and collector voltage source switch 28, respectively. Switch 28 is coupled to switch 20 by suitable means represented by dotted line 30 so that when switch 20 is placed in the closed switch position, switch 28 is also placed in the closed switch position at the same time. The emitter of transistor 12 is coupled to bistable multivibrator 32 through gate 34. The output of multivibrator 32 is applied along lead 36 to clamp 38 and second breakdown indicator 40. Lead 15 is connected to an input of gate 34 and to clamp 38. A source of potential −V is applied to clamp 38. A source of reference potential is connected to bistable multivibrator 32 by way of multivibrator reset switch 42. The reset switch is coupled to switch 20 by suitable means represented by dotted line 30 so as to close at the same time as switch 20 when switch 20 is placed in the closed position. Switch 42 is a switch which closes momentarily to reset bistable multivibrator 32.

When switch 20 is closed a signal is applied to lead 15 enabling current source 10 and is simultaneously applied to gate 34 along lead 44. The signal on lead 44 operates on gate 34 so sate 34 passes a signal present on the emitter of transistor 12 to bistable multivibrator 32 along lead 46. Multivibrator 32 is a suitable device arranged to respond to voltage transient *i* of FIG. 1*b* by switching states so as to provide a signal on output 36 when transient *i* is present which in turn operates upon clamp 38 to clamp off current source 10. Clamp 38, in effect couples lead 15 to source of voltage −V effectively cutting off or disabling current source 10 and therefore removing the test current from the emitter base junction of transistor 12. Gate 34, multivibrator 32 and clamp 38 are each suitable relatively fast reacting devices responding within a fraction of a microsecond when voltage transient *i* of FIG. 1*b* is generated should transistor 12 experience forward biased second breakdown.

When a gate 34 enabling signal is removed from lead 44 or is absent, gate 34 disconnects lead 46 from the input from emitter of transistor 12 within a fraction of a microsecond upon removal of the gate enabling signal blocking the passage to multivibrator 32 of any transient signals which may be present on the test transistor-emitter. The voltage applied to gate 34 from collector voltage source 26 causes gate 34 to close in the absence of the enabling signal on input lead 44. At the same time that a failure signal is applied to clamp 38 at the output 36 of multivibrator 32 to disable current source 10, the same signal is applied to second breakdown indicator 40 which may be an indicating light or similar device. This indicating light will indicate to an operator that a failure has in fact occurred.

As indicated, a voltage transient *i*, when present on the emitter of transistor 12 during the test when switch 20 is closed, will be passed by gate 34 to bistable multivibrator 32 triggering the multivibrator to provide a signal at output 36 operating clamp 38 to disable current source 10 and turning on indicator 40. However, an almost identical type transition *j*, FIG. 1*b*, will occur at the end of a test when switch 20 is opened, current source 10 is disabled and transistor 12 to be tested is turned off. Transient voltage *j* appears at the emitter of transistor 12 and unless otherwise prevented will be passed by gate 34 to multivibrator 32 which will generate a failure signal indicating a false failure. Since the entire test may take only a fraction of a second after the operator starts the test, the visual indication given by indicator 40 of a test failure will provide a misleading failure indication to an operator since he will not be able to distinguish between a true and a false failure indication as generated by transient voltages *i* and *j*, respectively.

To prevent this false indication from occurring, gate 34 is a suitable device which is provided in accordance with the present invention and which responds within a fraction of a microsecond after switch 20 is opened and a signal from lead 44 is removed so as to respond to a voltage from voltage source 26 and close gate 34 between the emitter of transistor 12 and lead 46 so that no false transient voltage *j* will be passed to multivibrator 32. As seen in FIG. 1*b*, the currents of the false transient voltage *j* occurs shortly after the end of the test at time $t_2$. Within the time period between $t_2$ and the occurrence of transient *j*, gate 34 is operated upon to prevent the passage of the transient *j* to multivibrator 32.

Thus there has been shown a circuit which responds within a fraction of a microsecond to a second breakdown failure transient signal to remove current source 10 from the emitter base circuit of transistor 12. However, upon removal of the current source 10 from transistor 12 cut off currents, which are small steady-state reverse currents which flow when a transistor is biased into non-conduction, are present between the collector and base of transistor 12. These currents are sufficiently high such as to cause destruction of transistor 12 even though the current source 10 has been disabled. To preclude transistor 12 from being destroyed by the cut off currents in the collector-base circuit, a disconnect diode 14 is provided. This disconnect diode 14 is a suitable high speed rectifier diode having a breakdown voltage commensurate with the highest $v_{dc}$ at which the equipment is to be used and a current carrying capability commensurate with the base current of the device being tested. The high speed diode, for example, would have a turnoff time of less than 0.2 microseconds. This turnoff time of diode 14 is sufficiently fast so that the collector-base cut off currents are shut off or disconnected from transistor 12 prior to the transistor destruction.

Clamp 38 is operative to clamp the input signal at lead 15 to −V so as to effectively short circuit the enabling signal of current source 10 immediately shutting off the current source prior to second breakdown caused by the emitter-base test current. Thus, in effect, while the test current is applied through the collector-emitter junction and is the mode by which second breakdown will occur, it has been found that second breakdown will also occur through the collector-base junction of the device due to the cut off currents flowing through the device under test. In accordance with the present invention, all currents flowing in the test circuit are immediately cut off in response to only the failure voltage transient *i* occurring at the emitter of transistor 12.

When testing transistor 12 for forward biased second breakdown, the operator moves the test switch 20 to its test or closed position which couples either the steady state +V or pulses from pulse generator 22 to current source 10. The operator may either hold switch 20 in the test position manually or means may be preferably provided in more sophisticated circuits for providing automatic timing devices responsive to pushbutton operation so as to cause switch 20 to remain closed for a predetermined time period. Such automatic devices are well within the skill of the art and preferably include such configurations as a set of relays wherein each of switches 20, 28 and 42 are contactors on the relays and a separate start pushbutton is provided for providing a current through the relay coils causing the contactors of the relays to close, in effect, closing switches 20, 28 and 42.

Additionally, means (not shown) may be provided in pulse generator 22 for coupling either high frequency pulses or low frequency pulses to current source 10. The high frequency pulses may be pulses of 1 millisecond in width and the low speed pulses may be in the order of five milliseconds to two seconds in width. Also, the pulse repetition rate may be controlled by means (not shown) which may vary the pulses from a single pulse to any desired pulse repetition rate. Additionally, the amplitude of the pulses may be set at any level as desired.

Upon starting of the test when reset switch 42 is momentarily closed, bistable multivibrator 32 is reset and clamp 38 is off due to the state of multivibrator 32 at lead 36, disconnecting lead 15 from voltage source −V. At the end of the test, providing that no failure has occurred the operator opens switch 20, the signal along lead 15 is cut off, gate 34 is closed immediately disconnecting the emitter of transistor 12 from bistable multivibrator 32 blocking the propagation of the transient voltage *i*, FIG. 1*b*, to multivibrator 32. Should a failure occur during the test, the transient voltage *i*, FIG. 1*b* is applied through gate 34 to multivibrator 32 which is immediately triggered applying a clamping signal at output 36 to clamp 38 which immediately connects lead 15 to −V cutting off current source 10.

Current source 10 is suitably a transistor as will be shown, which is not in saturation and therefore, in effect, has no storage time to be considered in shutting off and may respond with the degree of rapidity desired.

Suitable means may be connected across precision collector sensing resistor 24 to determine the collector current flowing during the test. Additionally, a voltmeter may be coupled across the collector-emitter circuit of the transistor under test to measure the test voltage of the device as desired. These readings are a measure of the energy applied to the transistor 12 during the test. These readings may be provided suitable storage devices (not shown) so that an operator may read the measurements without change until manually returned to start for the next test, the transistor being saved from damage by forward biased second breakdown currents in response to the transient voltage *i* occurring at the emitter of the transistor at the initiation of forward bias second breakdown.

A more complete circuit diagram of the test instrument built and operated according to the present invention is shown by way of example in FIG. 3. The various portions of the apparatus illustrated in FIG. 2 as rectangles are shown in more detail in FIG. 3 and are described more fully in connection therewith. Variable current source 10 comprises one or more transistors in accordance with the current testing requirements of the test apparatus. As illustrated in FIG. 3, there are two current source transistors Q1 and Q2 shown. However, Q2 may be eliminated or additional transistors may be added as desired. The bases of transistors Q1 and Q2 are each coupled to source of voltage −V through resistor 50, the emitters being coupled to a reference potential through ballast resistors 52, 53 and filtering capacitors 54 and 55. A source of voltage −V is respectively connected to the emitters of transistors Q1 and Q2 through resistors 52 and 53. The collectors of transistors Q1 and Q2 are each connected to the emitter of transistor 12 and to the anode of diode 14 through resistor 56 which serves to suppress parasitic oscillations. Capacitors 58, 59 are each coupled across voltage source 26 which may be a battery, as shown, to act as filters when switch 28 is opened and closed. Switch 28 serves as a safety device to cut off the collector source when the test is ended.

Clamp 38 comprises a transistor Q3 whose collector is connected to lead 15 and whose emitter is connected to source of voltage −V. The base of transistor Q3 is coupled through a diode 60 to resistor 62 to serve as level shifting and current limiting devices, respectively, and across which is capacitor 63 which speeds up the operation of transistor Q3 in response to a failure signal received from bistable multivibrator 32 along lead 36. Diode 60 is poled to flow current in a forward bias direction. Transistor Q3 is selected so as to provide, within a fraction of a microsecond, short circuiting of lead 15 to source of voltage −V upon receipt of an enabling signal from multivibrator 32.

Gate 34 comprises two transistors Q4 and Q5 with the base of transistor Q4 coupled to lead 15 through speed up capacitor 66 and current limiting resistor 68.

The positive terminal of voltage source 26 is connected by way of terminal 70 through resistor 72 to the collector of transistor Q4 and the base of transistor Q5 to source of voltage source −V through resistor 74, resistors 72 and 74 acting as a voltage divider network. The emitter of Q4 is connected to source of voltage −V and to the base of transistor Q4 through a suitable resistor 76. The emitter of Q5 is connected to the base of transistor Q5 through resistor 74, to the emitter of Q4, and to the base of Q4 through resistor 76. The collector of transistor Q5 is connected to the emitter of transistor 12 through a d.c. coupling resistor 78 and capacitor 80. The collector of transistor Q5 is connected to the anode of diode 82 and the cathode of diode 84. The anode of diode 84 is connected to the emitter of transistor Q5 while the cathode of diode 82 is connected to the bistable multivibrator 32 along lead 46.

Voltage source 26 applies a positive bias to transistor Q5 causing Q5 to be driven into conduction when Q4 is off connecting the emitter of transistor 12 to source −V through the collector-emitter path of Q5. When switch 20 is closed, the current source 10 enabling signal is applied through capacitor 66–resistor 68 network from lead 15 to the base of transistor Q4 driving transistor Q4 into conduction. When transistor Q4 is conducting, the current from voltage source 26 is bypassed to voltage level −V by the collector-emitter path of transistor Q4, removing the bias current from the base of transistor Q5, turning transistor Q5 off. Transistors Q4 and Q5 are selected so as to respond in a fraction of a microsecond to the current source 10 enabling signal from lead 15. When Q5 is turned off, any signal appearing at the collector thereof from the emitter of transistor 12 is passed through diode 82, the signal being the transient voltage *i*, FIG. 1*b*, to the input of bistable multivibrator 32 along lead 46. When switch 20 is opened, the signal is removed from the base of Q4, Q4 shuts off, Q5 turns on and the emitter of transistor 12 is again within a fraction of a microsecond, coupled to source of voltage −V. This all occurs prior to the occurrence of the turnoff transient voltage *j* at the emitter of transistor 12.

Bistable multivibrator input lead 46 is connected to the base of transistor Q6 and to a reference potential through resistor 90, diode 92 and resistor 94. Diode 92 is poled to prevent any signal present on lead 46 from being passed from resistor 90 to resistor 94 or through the collector-emitter path of Q7. This removes the voltage dividing effect of resistors 90 and 94 and the forward-biased collector-emitter path of Q7 which ordinarily would be present and which would reduce the effectiveness of the voltage transient signal appearing on lead 46. The emitter of transistor Q6 is connected to the emitter of transistor Q7 whose bases are respectively cross-coupled to the transistors' Q6 and Q7 collectors as shown. Each of the collectors of transistors Q7 and Q6 are connected to a reference potential through resistors 94 and 96, respectively. Reset switch 42 connects the base of transistor Q6 through a parallel R.C. network to source of voltage −V. The emitters of transistors Q6 and Q7 are coupled through a pair of diodes 98 and 99 to source of voltage −V. Diodes 98 and 99 are suitably provided to apply a positive bias at Q7 emitter relative to the base of Q6 and Q7 to ensure Q6 is biased in the off condition when multivibrator 32 is reset and provide noise immunity during the switching of the multivibrator. Q6 is normally off and Q7 is normally on during the test. If Q6 should be on at the start of the test, the pressing of switch 42 will turn Q6 off, driving Q7 on placing the multivibrator in its normal condition.

When a transient voltage such as voltage transient *i* in FIG. 1*b* is applied to lead 46, transistor Q6 is immediately turned on, transistor Q7 is turned off, the collector of transistor Q7 goes high providing a biasing signal for the clamp transistor Q3, turning transistor Q3 on. When transistor Q3 goes on, a short circuit is provided between lead 15 and source of voltage −V and current source 10 is immediately shut off transistors Q1 and Q2 of the current source not being in saturation. At the same time, the signal on lead 36 is applied to the base of transistor Q8 which is a second breakdown indicator drive transistor. When Q8 is turned on, the current flows through the second breakdown indicator light 40 indicating the presence of a failure.

When switch 42 is closed, the biasing signal present on the base of Q6 is removed and Q6 is turned off returning multivibrator 32 to its normal state.

The operation of the circuits of FIGS. 2 and 3 are similar. However the following more detailed explanation may be helpful in connection with FIG. 3.

To test a transistor such as transistor 12 for forward bias second breakdown, forwad bias is applied to transistor 12 by making the emitter thereof more negative than the base by way of voltage source −V. Test switch 20 is closed after mode selection switch 18 is placed in the selected mode whether it be a constant d.c. level as illustrated in drawings or a series of pulses. When switch 20 is closed, switches 28 and 42 are also simultaneously closed, switch 42 being a momentary switch and switch 28 being placed in the closed position for the duration of the test. The connection of the switches is by way of means represented by dotted line 30 which is fragmented for simplicity of illustration. Switch 20 is closed, switch 28 is closed and switch 42 is momentarily closed. Current source 10 is enabled, collector voltage source 26 is applied to the collector-base circuit of transistor 12, gate 34 is opened between the emitter of transistor 12 and lead 46 by the constant d.c. lead from +V applied to the base of transistor Q4. When a signal is present on the emitter of transistor 12 above a given threshold which is suitably determined in accordance with the device to be tested, in this instance, ground, a transient voltage occurring during second breakdown failure of the transistor will be passed by gate 34 to lead 46. Shortly thereafter, clamp 38 is disabled since the biasing voltage for clamp transistor Q3 is removed from lead 36 by the closure of switch 42. With the current source enabled, test current flows through the collector-emitter circuit of transistor 12. The transistor 12 is driven on by forward bias applied between the emitter and base electrodes since the emitter of transistor 12 will be at a more negative voltage than the base. The current source supplies the test current through the emitter-collector path of transistor 12 by way of the reference potential connection to the anode of diode 14 to the emitters of transistors Q1 and Q2. The current flowing through the collector and emitter of transistor 12 is at a predetermined test level. This level by way of example may be 500, 10 microsecond wide pulses per second, at 4 amperes and 95 volts. These figures are only exemplary as currents as great as 15 to 20 amperes may be applied to a transistor under test in accordance with the present invention. This high power test signal flowing through the collector-emitter circuit of transistor 12 will cause forward bias second breakdown of some transistors. For example, the voltage at the emitter of the transistor will follow the curve of FIG. 1$a$ along dotted line $e$. The energy applied to the transistor may be substantially above the second breakdown point for that transistor such as at $f$ of FIG. 1$a$. This higher energy level applied to the transistor which is above its second breakdown point tends to drive the transistor rapidly into second breakdown. Thus there arises the desirability of shutting off all currents through the transistor under test prior to the destruction of this transistor.

This occurs when the voltage transient $i$ of FIG. 1$b$ is passed immediately through the resistor-capacitor network 78, 80 of FIG. 3 through diode 82 to lead 46 to the input of bistable multivibrator 32 at time $t_f$ of FIG. 1$b$. Prior to the transistor currents reaching the level, for example, at point $l$ of FIG. 1$a$, which may be a matter of a fraction of a microsecond after the occurrence of point $k$ at which the voltage transient $i$ occurs, a circuit built and operated in accordance with the present invention, shuts off the test current through both the collector and emitter-base junctions. Transient voltage i immediately switches bistable multivibrator 32 so as to short circuit the base of current source transistors Q1 and Q2 to source −V. Any currents at cut off flowing through the collector-base junction are immediately blocked within 0.2 micorseconds by disconnect diode 14.

Apparatus built and operated in accordance with the present invention has successfully demonstrated sensing a three volt transient voltage of 50 nanoseconds duration at the emitter of transistor 12 and has shut down all currents through the test transistor within half a microsecond utilizing test currents between a half and 15 ampere pulses anywhere between 5 microseconds to 2 seconds in width.

Thus there has been shown in accordance with the present invention an apparatus for applying a test current through each of the main electrodes of a transistor under test whereby upon the occurrence of forward bias second breakdown of a transistor, a transient signal appears at one of the main electrodes. Means are provided coupled to the transistor and responsive to the occurrence of a transient signal at the main electrode for removing the test current from the main electrodes prior to destructive failure of the transistor.

What is claimed is:

1. An apparatus for non-destructively testing a transistor having a control electrode and a pair of main electrodes, comprising:

first means for applying forward bias between said control electrode and one of said main electrodes, second means enabled during said testing for applying a test current through each of said main electrodes whereby upon the occurrence of forward bias second breakdown of said transistor a voltage transient signal of increasing value appears at one of said main electrodes, and third means coupled to said second means and said transistor and responsive to the occurrence of said transient signal at said main electrode for removing said test current from said main electrodes prior to the destructive failure of said transistor, said third means including fourth means coupled to said transistor and said second means and responsive to said transient signal applied thereto for disabling said second means upon receipt of said transient signal by said fourth means, said test current tending to continue to flow through one of said main electrodes and said control electrode when said second means is disabled, said third means further including fifth means coupled between said control electrode and said last-mentioned one main electrode for blocking the continuing test current through said last-mentioned one main electrode and said control electrode when said test current is disabled.

2. The apparatus of claim 1 wherein said fifth means includes a unidirectional device coupled between said main electrodes and said control electrode and poled to block the flow of said continuing current through said control electrode when said second means is disabled.

3. An apparatus for non-destructively testing a transistor having a control electrode and a pair of main electrodes, comprising:

forward bias means for applying forward bias between said control electrode and one of said main electrodes, test current means enabled during said testing for applying a test current through each of said main electrodes whereby upon the occurrence of forward bias second breakdown of said transistor a transient voltage appears at one of said main electrodes, clamping means coupled to said test current means and normally disabled, said clamping means when enabled disabling said test current, and enabling means coupled to the one main electrode at which said voltage transient appears and to said clamping means and responsive to said voltage transient for enabling said clamping means upon the occurrence of said voltage transient, said test current tending to continue to flow through one of said main electrodes and said control electrode when said test current means is disabled, said apparatus including means coupled to said main electrodes and to said control electrode for blocking the flow of the continuing test current through said last-mentioned one main electrode and said control electrode when said test current is disabled.

4. An apparatus for non-destructively testing a transistor having a control electrode and a pair of main electrodes, comprising:

forward bias means for applying forward bias between said control electrode and one of said main electrodes, test current means enabled during said testing for applying a test current through each of said main electrodes whereby upon the occurrence of forward bias second breakdown of said transistor a transient voltage appears at one of said main electrodes, clamping means coupled to said test current means and normally disabled, said clamping means when enabled disabling said test current, and enabling means coupled to the one main electrode at which said voltage transient appears and to said clamping means and responsive to said voltage transient for enabling said clamping means upon the occurrence of said voltage transient, said transistor being caused by said testing to generate a false second breakdown transient voltage at said last-mentioned one main electrode, said false transient voltage occurring at a time known as priori by said apparatus, said apparatus including disabling means coupled to said enabling means for disabling said enabling means prior to the occurrence of said false transient voltage.

5. An apparatus for non-destructively testing a transistor having a control electrode and a pair of main electrodes, comprising:

a current source which when enabled applies a test current through each of said main electrodes and said control electrode whereby upon the occurrence of forward bias second breakdown of said transistor a voltage transient appears at one of said main electrodes, forward bias means for applying forward bias between said control electrode and said one main electrode, test current enabling means coupled to said current source for enabling said current source during said testing, and test current disabling means coupled to said transistor and said enabling means and responsive to the occurrence of said transient voltage at said main electrode for disabling said test current enabling means upon the occurrence of said transient voltage, said apparatus further including circuit disconnect means including a diode connected between said control and the other of said main electrodes poled to flow current in the forward bias direction for blocking the flow of current through said control electrode and said other main electrode when said current source is disabled.

6. An apparatus for non-destructively testing a transistor havnig a control electrode and first and second main electrodes, comprising:

a current source which when enabled applies a test current through each of said main electrodes and said control electrode whereby upon the occurrence of forward bias second breakdown of said transistor a voltage transient appears at said first main electrode, forward bias means coupled to said transistor for applying forward bias between said control electrode and said main electrode, switching means having first and second switch conditions coupled to said current source for enabling said current source when in said first switch condition, and circuit means coupled to said first main electrode and to said current source, and responsive to said voltage transient for disabling said current source irrespective of said first switch condition of said switching means upon receipt of said transient voltage by said circuit means, said apparatus further including current blocking means coupled between said control electrode and said second main electrode for blocking the flow of current through said control electrode in the reverse bias direction.

7. An apparatus for non-destructively testing a transistor having a control electrode and a pair of main electrodes, comprising:

means for applying forward bias between said control electrode and one of said main electrodes, means for connecting a current source between a first main electrode and a control electrode of said transistor, said current source when enabled applying a test current to said transistor, means having enabling and disabling states for enabling said current source when in the enabling state to render said transistor conductive whereby a test current flows from said current source through said main electrodes, a voltage transient appearing at said first main electrode upon the occurrence of forward biased second breakdown of said transistor, gating means having an output terminal coupled to said transistor and said enabling means and responsive to the state of said enabling means for passing said voltage transient to said output terminal only when said enabling means is in the enabling state, and trigger means coupled to said gating means output terminal and to said enabling means and responsive to said voltage transient for providing a trigger signal in response to the receipt of said voltage transient by said trigger means to place said enabling means in the disabling state.

8. The apparatus of claim 7 further including current blocking means connected between said control electrode and a second main electrode for blocking the flow of current through said second main electrode and said control electrode when said current source is disabled.

9. The apparatus of claim 7 wherein said trigger means includes a bistable multivibrator.

* * * * *